United States Patent
Nien et al.

(10) Patent No.: US 8,213,801 B2
(45) Date of Patent: Jul. 3, 2012

(54) LIGHT EMITTING DEVICE, LIGHT RECEIVING DEVICE, DATA TRANSMISSION SYSTEM AND DATA TRANSMISSION METHOD USING THE SAME

(75) Inventors: Chin-Chung Nien, Hsinchu (TW); Chen-Ying Kao, Taoyuan County (TV); Ching-Ting Hsu, Taipei County (TW); I-Shinn Tien, Hsinchu (TW); Yi-Yuan Chen, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 642 days.

(21) Appl. No.: 12/424,084

(22) Filed: Apr. 15, 2009

(65) Prior Publication Data
US 2010/0172651 A1    Jul. 8, 2010

(30) Foreign Application Priority Data
Jan. 7, 2009   (TW) ................................ 98100423 A

(51) Int. Cl.
*H04B 10/00* (2006.01)
(52) U.S. Cl. ........ 398/119; 398/118; 398/130; 398/158; 398/208
(58) Field of Classification Search .................. 398/103, 398/118–131, 135, 172; 382/100; 359/21; 348/207, 207.11
See application file for complete search history.

(56) References Cited

U.S. PATENT DOCUMENTS

| | | | | |
|---|---|---|---|---|
| 5,793,880 | A * | 8/1998 | Constant | 382/100 |
| 6,798,445 | B1 * | 9/2004 | Brumitt et al. | 348/207.11 |
| 7,411,609 | B2 | 8/2008 | Brumitt et al. | |
| 2005/0249507 | A1 * | 11/2005 | Gardiner | 398/187 |
| 2008/0239425 | A1 * | 10/2008 | Yoshida | 359/21 |
| 2009/0052902 | A1 * | 2/2009 | Shinokura | 398/118 |

FOREIGN PATENT DOCUMENTS
WO    99/49435    9/1999
* cited by examiner

*Primary Examiner* — Li Liu
(74) *Attorney, Agent, or Firm* — Thomas|Kayden

(57) ABSTRACT

A light emitting device, a light receiving device and a data transmission system and a data transmission method using the same are provided. The data transmission system includes the light emitting device and the light receiving device. The light emitting device includes a light emitting unit and a control circuit, and the light receiving device includes an image capture unit, a recognition unit and a decoding unit. The control circuit controls the light emitting unit to sequentially display a plurality of pattern images in a plurality of frame times to form a spatiotemporal pattern image according to setting data corresponding to a temporal domain and a spatial domain. The image capture unit captures the spatiotemporal pattern image. The recognition unit recognizes the spatiotemporal pattern image to output recognized data. The decoding unit decodes the recognized data to output decoded data.

20 Claims, 7 Drawing Sheets

LIGHT EMITTING DEVICE, LIGHT RECEIVING DEVICE, DATA TRANSMISSION SYSTEM AND DATA TRANSMISSION METHOD USING THE SAME

This application claims the benefit of Taiwan application Serial No. 98100423, filed Jan. 7, 2009, the subject matter of which is incorporated herein by reference.

BACKGROUND OF THE INVENTION

1. Field of the Invention

The invention relates to a light emitting device, a light receiving device and a data transmission system and a data transmission method using the same.

2. Description of the Related Art

At present, most of the frequently seen data transmission techniques adopt the channel encoding technique to perform channel encoding on the information to be carried and then perform the transmission. The channel encoding is a special encoding method for preventing a channel effect from causing serious and remediless damages on the transmission signal. The main encoding schemes include a scrambler, a convolution encoder, an interleaving encoder, multi-level coding, pilot signals and mapping. The scrambler may generate a pseudo random bit sequence (PRBS) to be mixed with a two-bit signal to prevent the signal from causing the regular pattern so that the energy is over concentrated. The convolution encoder can convolute a few redundant signals and the two-bit signal to lengthen the code distance and enhance the error correcting ability during receiving. The interleaving encoder may disperse the bits in each block and exchange the bits in the block with the bits in other blocks. The purpose is to prevent the bit signal from causing the clustering phenomenon and thus to prevent the neighboring signal from causing the continuity error when being modulated. The multi-level coding, also referred to as trellis coded modulation, may optimize the encoding and modulation so that the transmission may achieve the optimum efficiency. The pilot signals with the constant level may be inserted into an OFDM signal sequence in order to perform channel estimation and error signal tracking according to the known signals so that the digital modulation becomes very perfect. As for the mapping, the channel-encoded signal may be mapped to a plurality of constellation graphs of QAM so that the FFT can perform the OFDM modulation.

However, the channel encoding technique has the high encoding complexity, needs to be combined with a lot of mathematical operations and needs to refer to the property of the channel. So, how to provide a data transmission technique, which has the low encoding complexity, does not need to be combined with a lot of mathematical operations and does not need to refer to the property of the channel, is a subject eager to be achieved.

SUMMARY OF THE INVENTION

The invention is directed to a data transmission system, a data transmission method, a light emitting device and a light receiving device, which has the low encoding complexity, needs not to be combined with a lot of mathematical operations and needs not to refer to the property of the channel.

According to a first aspect of the present invention, a data transmission system is provided. The data transmission system includes a light emitting device and a light receiving device. The light emitting device includes a light emitting unit and a control circuit. The light receiving device includes an image capture unit, a recognition unit and a decoding unit. The control circuit controls the light emitting unit to sequentially display a plurality of pattern images in a plurality of frame times to form a spatiotemporal pattern image according to setting data corresponding to a temporal domain and a spatial domain. The image capture unit captures the spatiotemporal pattern image. The recognition unit recognizes the spatiotemporal pattern image to output recognized data. The decoding unit decodes the recognized data to output decoded data.

According to a second aspect of the present invention, a light emitting device is provided. The light emitting device includes a light emitting unit and a control circuit. The control circuit controls the light emitting unit to sequentially display a plurality of pattern images in a plurality of frame times to form a spatiotemporal pattern image according to setting data corresponding to a temporal domain and a spatial domain.

According to a third aspect of the present invention, a light receiving device is provided. The light receiving device includes an image capture unit, a recognition unit and a decoding unit. The image capture unit captures a spatiotemporal pattern image. The recognition unit recognizes the spatiotemporal pattern image to output recognized data. The decoding unit decodes the recognized data to output decoded data.

According to a forth aspect of the present invention, a data transmission method is provided. The data transmission method includes the steps of: controlling a light emitting unit to sequentially display a plurality of pattern images in a plurality of frame times to form a spatiotemporal pattern image according to setting data corresponding to a temporal domain and a spatial domain; capturing the spatiotemporal pattern image; recognizing the spatiotemporal pattern image to output recognized data; and decoding the recognized data to output decoded data.

The invention will become apparent from the following detailed description of the preferred but non-limiting embodiments. The following description is made with reference to the accompanying drawings.

DETAILED DESCRIPTION OF THE INVENTION

Figure 1:
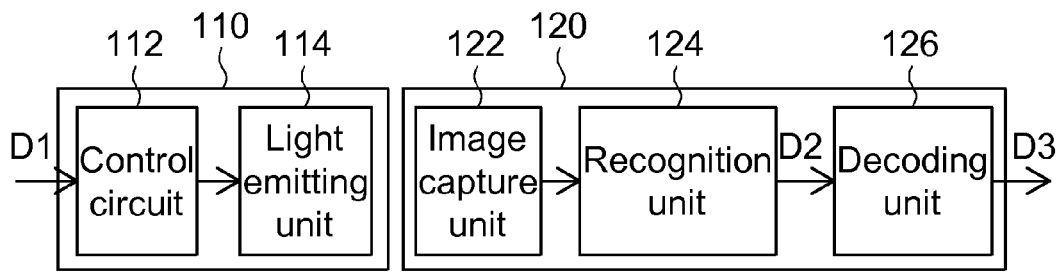
FIG. 1 is a block diagram showing a data transmission system according to a preferred embodiment of the invention.
Figure 2:
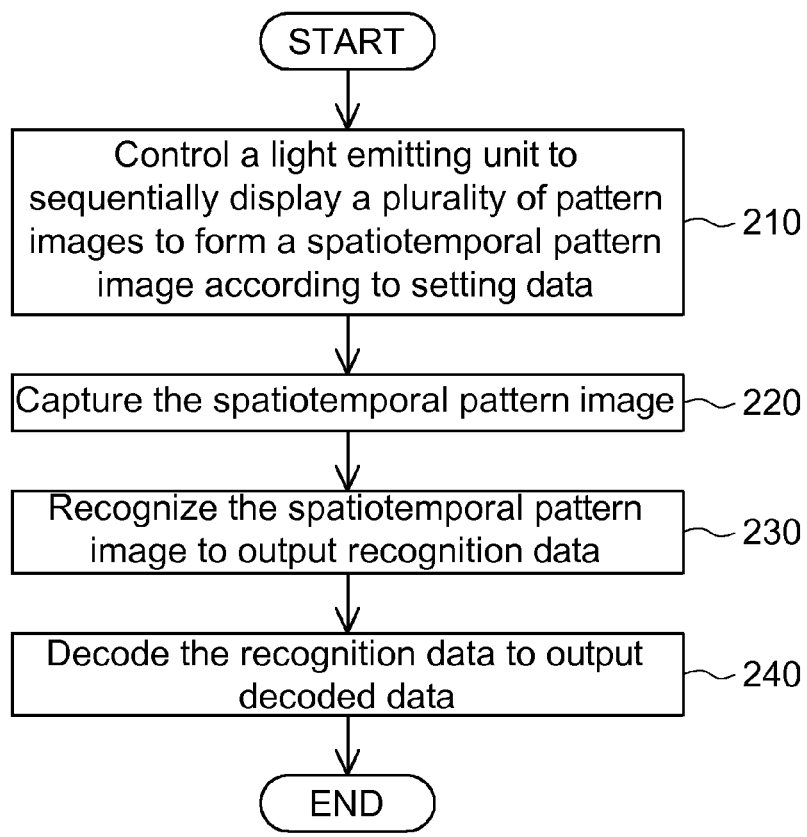
FIG. 2 is a flow chart showing a data transmission method according to a preferred embodiment of the invention.
Figure 3:
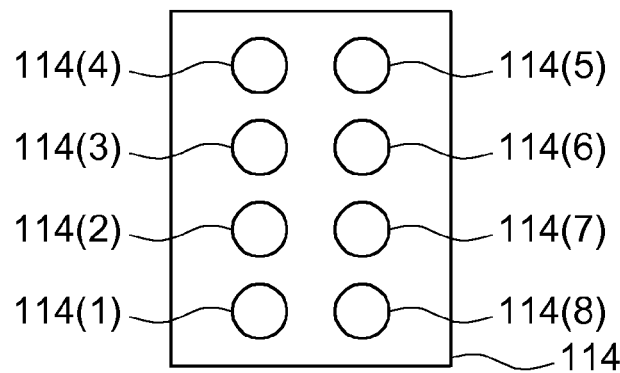
FIG. 3 is a schematic illustration showing a light emitting unit.
Figure 4:
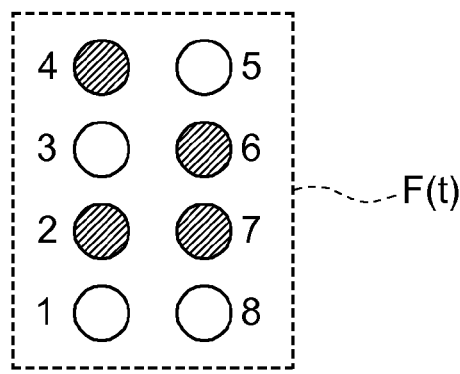
FIG. 4 shows a pattern image when a frame time is t.
Figure 5:
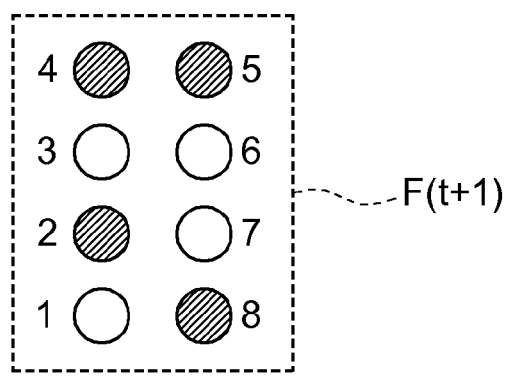
FIG. 5 shows a pattern image when a frame time is (t+1).
Figure 6:
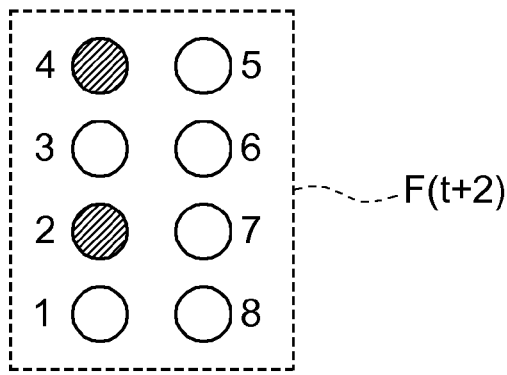
FIG. 6 shows a pattern image when a frame time is (t+2).
Figure 7:
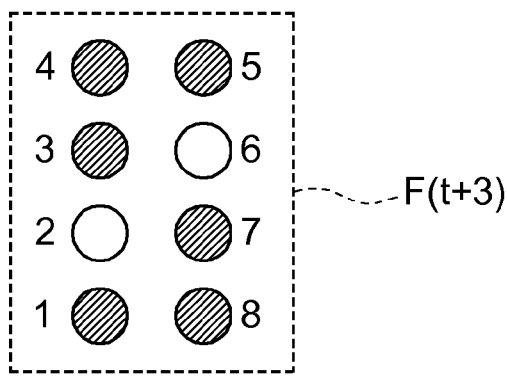
FIG. 7 shows a pattern image when a frame time is (t+3).
Figure 8:
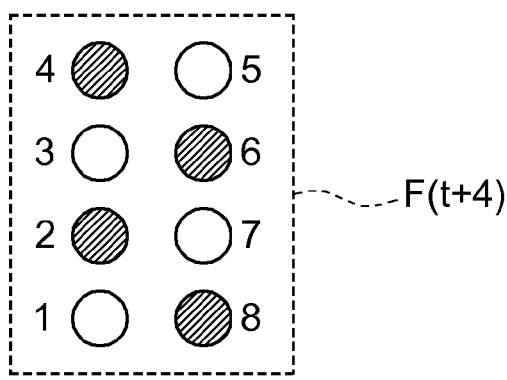
FIG. 8 shows a pattern image when a frame time is (t+4).
Figure 9:
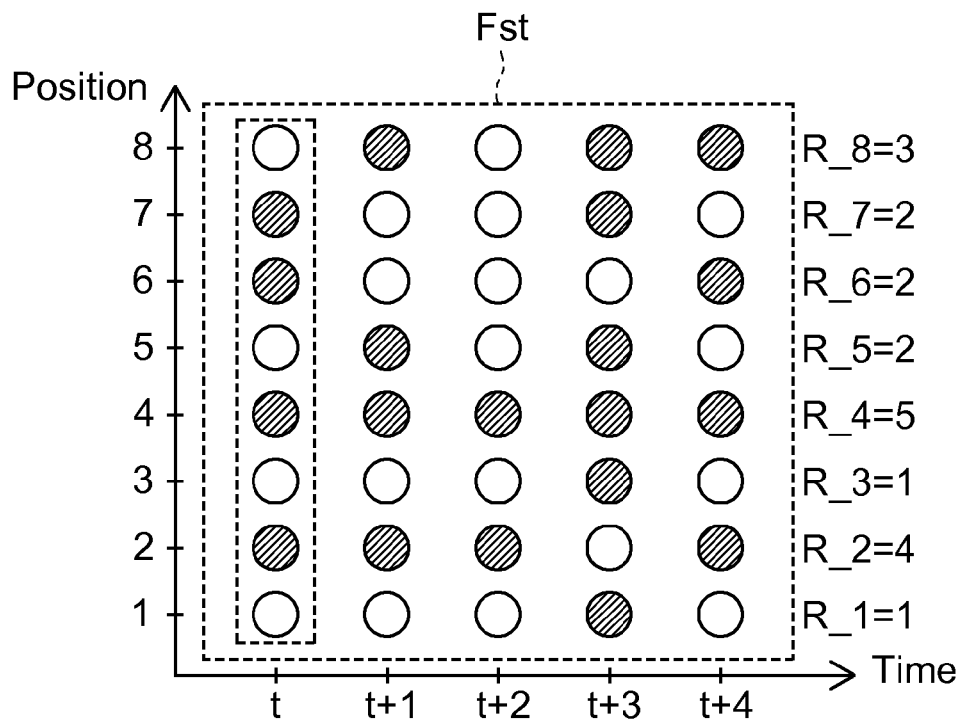
FIG. 9 shows a spatiotemporal pattern image.

FIG. 1 is a block diagram showing a data transmission system 10 according to a preferred embodiment of the invention. FIG. 2 is a flow chart showing a data transmission method according to a preferred embodiment of the invention. FIG. 3 is a schematic illustration showing a light emitting unit. FIG. 4 shows a pattern image when a frame time is t. FIG. 5 shows a pattern image when a frame time is (t+1). FIG. 6 shows a pattern image when a frame time is (t+2). FIG. 7 shows a pattern image when a frame time is (t+3). FIG. 8 shows a pattern image when a frame time is (t+4). FIG. 9 shows a spatiotemporal pattern image.

Referring to FIGS. 1 to 9, the data transmission system 10 includes a light emitting device 110 and a light receiving device 120. The light emitting device 110 includes a control circuit 112 and a light emitting unit 114, which includes, for example, one single light emitting element or a plurality of light emitting elements. The light receiving device 120 includes an image capture unit 122, a recognition unit 124 and a decoding unit 126. The data transmission method may be preferably applied to the data transmission system 10. First, as shown in step 210, the control circuit 112 controls the light emitting unit 114 to sequentially display a plurality of pattern images in a plurality of frame times to form a spatiotemporal pattern image according to setting data D1 corresponding to a temporal domain and a spatial domain. If the number of the light emitting elements of the light emitting unit 114 is M and the number of the pattern images is N, then the size of the spatiotemporal pattern image is equal to M×N, wherein M and N are positive integers.

For the sake of simple illustration, the following with M=8 and N=5 will be described as an example. However, the invention is not limited thereto, and the number of the light emitting elements and the number of the pattern images may be adjusted according to the requirement. For example, the light emitting unit 114 includes light emitting elements 114(1) to 114(8), which have the relative positions of position 1 to position 8. The pattern image F(t) displayed by the light emitting unit 114 in the frame time (t) is illustrated in FIG. 4. The pattern image F(t+1) displayed by the light emitting unit 114 in the frame time (t+1) is illustrated in FIG. 5. The pattern image F(t+2) displayed by the light emitting unit 114 in the frame time (t+2) is illustrated in FIG. 6. The pattern image F(t+3) displayed by the light emitting unit 114 in the frame time (t+3) is illustrated in FIG. 7. The pattern image F(t+4) displayed by the light emitting unit 114 in the frame time (t+4) is illustrated in FIG. 8. The light emitting unit 114 sequentially displays the pattern images F(t) to F(t+4) in the frame times (t) to (t+4) to form the spatiotemporal pattern image shown in FIG. 9. As shown in FIGS. 4 to 9, the data transmission system 10 may further transmit more information through the temporal domain.

Next, as shown in step 220, the image capture unit 122 captures a spatiotemporal pattern image Fst. Next, as shown in step 230, the recognition unit 124 recognizes the spatiotemporal pattern image Fst to output recognized data D2. Then, as shown in step 240, the decoding unit 126 decodes the recognized data D2 to output decoded data D3.

It is to be specified that the setting data D1 may preferably control the $i^{th}$ light emitting element of the light emitting unit 114 to be ignited in at least one of the frame times (t) to (t+4), in order to prevent the light emitting element in the light emitting unit 114 from breaking down to cause the mis-judgement of the light receiving device 120, wherein "i" ranges from 1 to 8. As shown in FIG. 9, for example, the number of times of ignition is defined as R_i, which represents the number of times that the light emitting element 114(i) is ignited in the frame times (t) to (t+1), wherein "i" ranges from 1 to 8.

As shown in FIG. 9, it is obtained that the number of time of ignition of the light emitting element 114(1) is R_1=1; the number of times of ignition of the light emitting element 114(2) is R_2=4; the number of time of ignition of the light emitting element 114(3) is R_3=1; the number of times of ignition of the light emitting element 114(4) is R_4=5; the number of time of ignition of the light emitting element 114(5) is R_5=2; the number of times of ignition of the light emitting element 114(6) is R_6=2; the number of times of ignition of the light emitting element 114(7) is R_7=2; and the number of times of ignition of the light emitting element 114(8) is R_8=3. Consequently, it is obtained that the setting data D1 preferably needs to make the number of times of ignition R_i be greater than 0. So, the mis-judgement of the light receiving device 120 cannot be seriously influenced even if some light emitting elements of the light emitting unit 114 break down.

Figure 10:
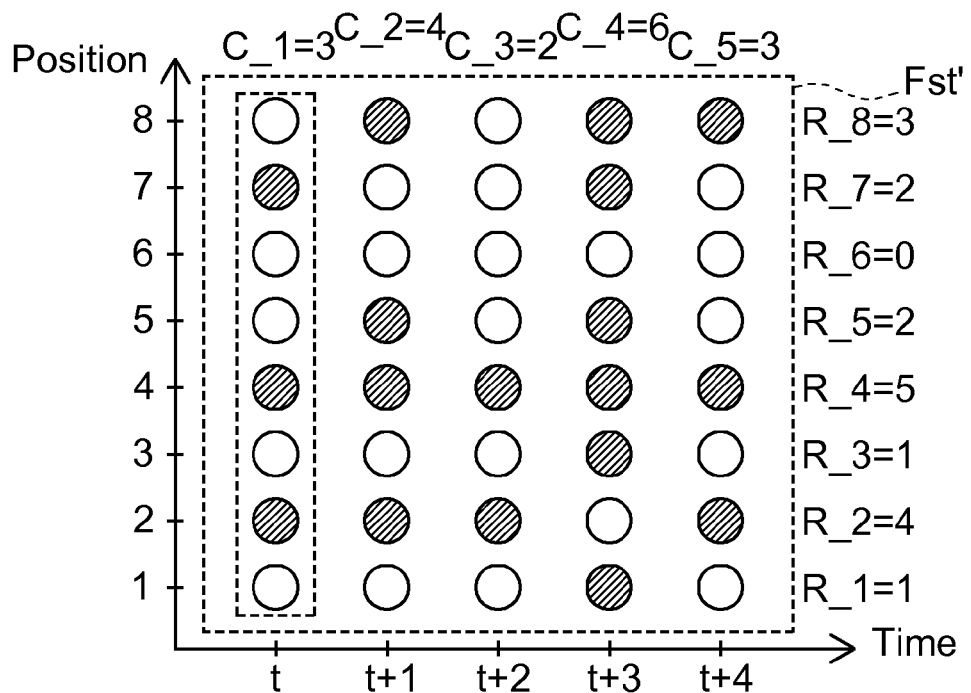
FIG. 10 shows a spatiotemporal pattern image when the light emitting unit breaks down.

FIG. 10 shows a spatiotemporal pattern image Fst' when the light emitting unit breaks down. The difference between the spatiotemporal pattern image Fst' of FIG. 10 and the spatiotemporal pattern image Fst of FIG. 9 will be described in the following. As shown in FIG. 10, it is found that the number of times of ignition is R_6=0 in FIG. 10. Because the setting data D1 does not allow the number of times of ignition R_6 to be equal to 0, it means that the light emitting element 114(6) breaks down. Because the data transmission system 10 has the fault tolerance ability, a few light emitting elements, which break down, cannot cause the serious decoding error. The light receiving device 120 still can perform the recognition according to other light emitting elements, which do not break down. In FIG. 10, the data completeness ratio is (M−D)/M, wherein D represents the number of light emitting elements, which break down, so the data completeness ratio of FIG. 10 is equal to (8−1)/8=87.5%.

In addition, the data transmission system 10 may preferably further include an alerting unit (not shown). When the number of times of ignition R_i is equal to 0, an alerting signal is outputted. The user can immediately repair the light emitting element according to the alerting signal to prevent the data from being misjudged.

Figure 11:
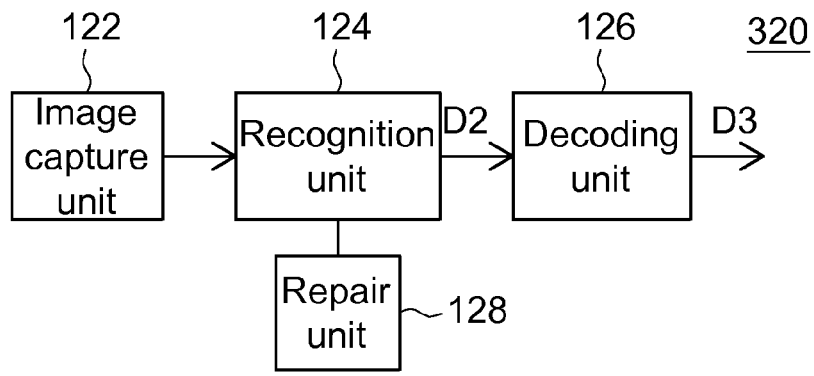
FIG. 11 is a schematic illustration showing a light receiving device having a repair unit.
Figure 12:
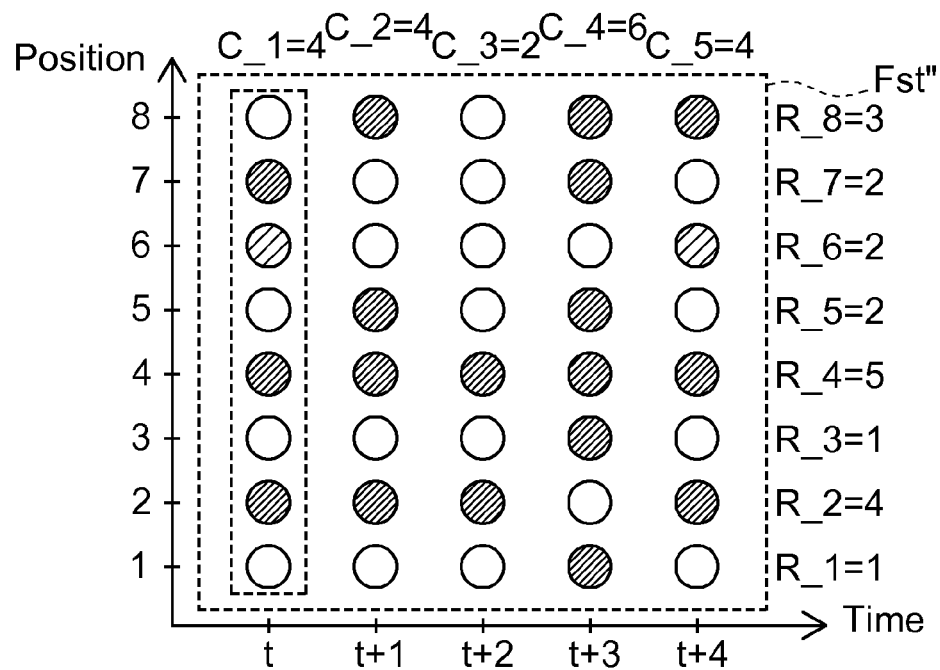
FIG. 12 shows a spatiotemporal pattern image after repair.

FIG. 11 is a schematic illustration showing a light receiving device 320 having a repair unit. FIG. 12 shows a spatiotemporal pattern image after repair. Referring to FIGS. 10 to 12, the difference between the light receiving device 320 and the light receiving device 120 of FIG. 1 is that the light receiving device 320 further includes a repair unit 128 for performing the parity check to repair the recognized data D2. The parity check is, for example, an odd parity check or an even parity check. For the sake of simplicity, the number of times of ignition C_j is defined to represent the number of the $j^{th}$ column of light emitting elements being ignited, and the even parity check will be described as an example.

In FIG. 10, the repair unit 128 performs the even parity check to obtain the number of times of ignition C_1=3, the number of times of ignition C_2=4, the number of times of ignition C_3=2, the number of times of ignition C_4=6 and the number of times of ignition C_5=3. Because the number of times of ignition R_6=0 and the number of times of ignition C_1=3, and the number of times of ignition C_5=3 is the odd number but not the even number, the repair unit 128 judges that the light emitting element 114(6) should be ignited in the frame time (t) and the frame time (t+4), but cannot be displayed because the light emitting element 114(6) breaks down. The repair unit 128 repairs the recognized data D2 according to this even parity check so that the repaired spatiotemporal pattern image Fst" is shown in FIG. 12 and the recognition ratio can be enhanced.

Figure 13:
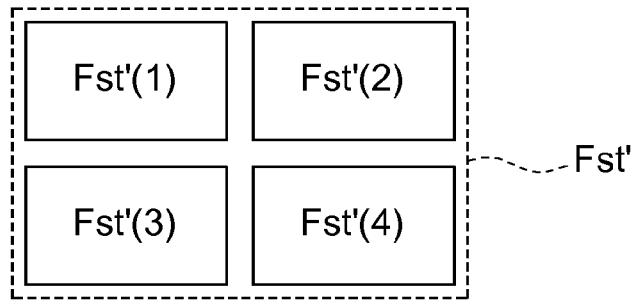
FIG. 13 is a schematic illustration showing the spatiotemporal pattern image being divided.

FIG. 13 is a schematic illustration showing the spatiotemporal pattern image being divided. If the number of the light emitting elements, which break down, is greater than 2, the to-be-repaired spatiotemporal pattern image may be divided into several spatiotemporal pattern image blocks having the same size. For example, the to-be-repaired spatiotemporal pattern image Fst' is first divided into the spatiotemporal pattern image blocks Fst'(1) to Fst'(4) with the same size, and the repair unit 128 further performs the parity check on each spatiotemporal pattern image block to repair the block.

Figure 14:
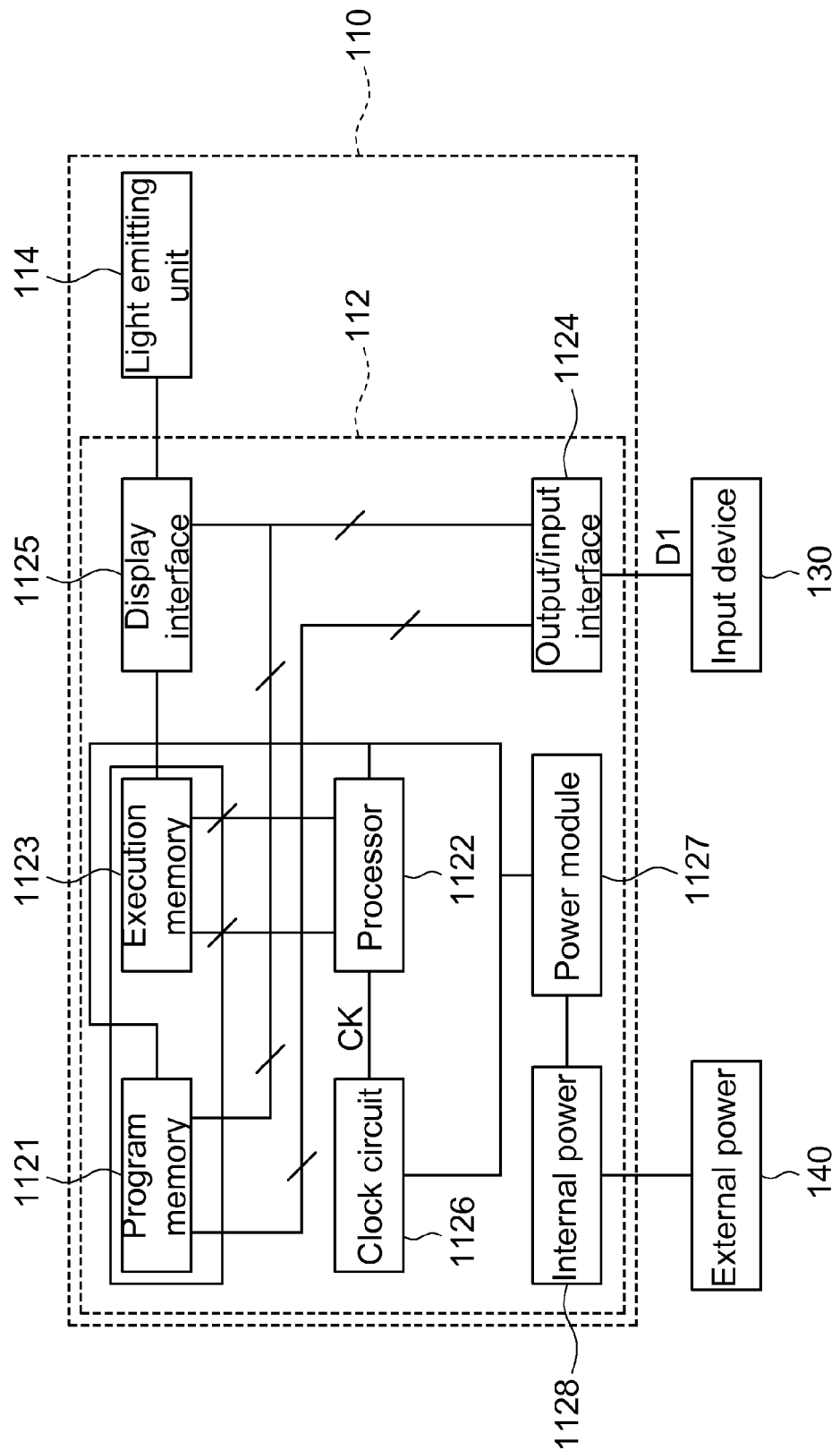
FIG. 14 is a block diagram showing a light emitting device.
Figure 15:
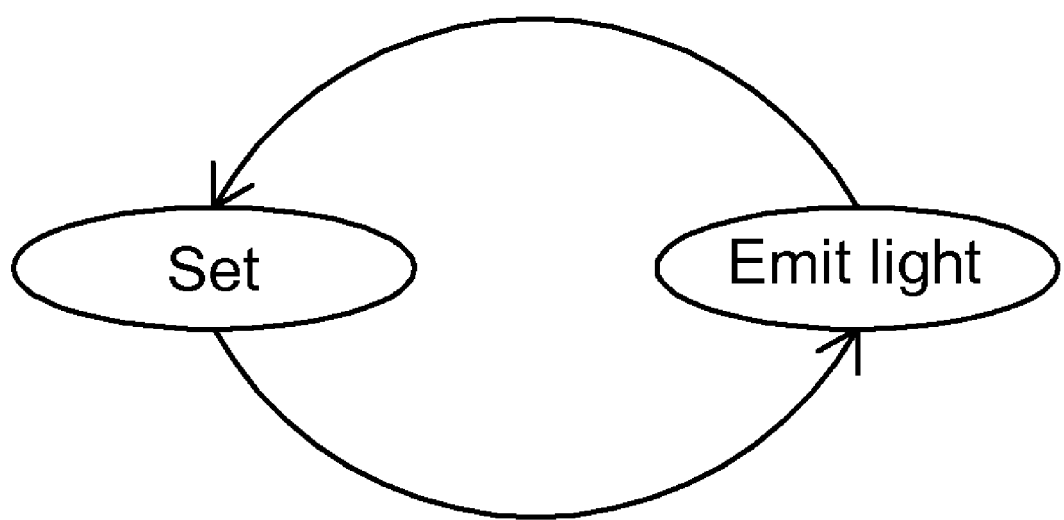
FIG. 15 shows the state of the light emitting device.

FIG. 14 is a block diagram showing a light emitting device. FIG. 15 shows the state of the light emitting device. Referring to FIGS. 14 and 15, the control circuit 112 is coupled to the light emitting unit 114 to control the light emitting unit 114, and the control circuit 112 is coupled to an input device 130 to receive the setting data D1. The control circuit 112 includes a program memory 1121, a processor 1122, an execution memory 1123, an output/input interface 1124, a display interface 1125, a clock circuit 1126, a power module 1127 and an internal power 1128. The program memory 1121 stores the program. The output/input interface 1124 receives the setting data D1 inputted by the input device 130, and the output/input interface 1124 may be a PS/2 interface, an RS232 interface, a universal serial bus (USB) interface or an IR interface, for example. The input device 130 is a keyboard, a personal computer, a personal mobile digital assistant or any other device capable of inputting data. The processor 1122 executes the program to encode the setting data D1 into spatiotemporal pattern data D2. The processor 1122 is a single chip, a system on chip or a central processing unit (CPU). The execution memory 1123 temporarily stores the data generated when the processor 1122 is executing the program. The display interface 1125 drives the light emitting unit 114 to display the spatiotemporal pattern image according to the spatiotemporal pattern data D2. The clock circuit 1126 provides a clock signal CK to the processor 1122. The power module 1127 rectifies and regulates an external power 140 and then transforms the external power 140 into the working power for the control circuit 112, and also stores the working power to the internal power 1128 coupled to the power module 1127. The internal power 1128 is an electric power storage, while the external power 140 is a solar energy or mains.

The light emitting device 110 selectively enters a setting state or a light emitting state (see FIG. 15) according to a connected state between the input device 130 and the output/input interface 1124. After the input device 130 is connected to the light emitting device 110 through the output/input interface 1124, a control bus inside the control circuit 112 starts to communicate with the input device 130. The control circuit 112 controls the light emitting device 110 to enter the setting state after identifying the connection mode so that the user inputs the setting data D1 through the input device 130. The setting data D1 includes, for example, pattern data and flicker frequency data.

The control circuit 112 can further judge whether the setting data D1 is correct to determine whether to receive the setting data D1. For example, if the setting data D1 makes the number of times of ignition R_i be equal to 0, then the setting data D1 is incorrect and the control circuit 112 does not receive the setting data D1. Oppositely, if the setting data D1 makes the number of times of ignition R_i be greater than 0, then the setting data D1 is correct and the control circuit 112 receives the setting data D1. When the input device 130 has the display ability, the control circuit 112 may further reply an identification message to the input device. After the setting data D1 is identified as correct, the processor 1122 stores the setting data D1 to the program memory 1121.

After the output/input interface 1124 is disconnected from the input device 130 from the connected state, the light emitting device 110 enters a light emitting state to display the spatiotemporal pattern image. In the light emitting state, the processor 1122 stores the setting data D1, stored in the program memory 1121, to the execution memory 1123. The processor 1122 arranges the pattern data and the flicker frequency data of the setting data D1, and then outputs the arranged data to the display interface 1125 and drives the light emitting unit 114 through the display interface 1125.

In the data transmission system, the data transmission method, the light emitting device and the light receiving device according to the embodiment of the invention, the encoding complexity is low, and it is unnecessary to combine with a lot of mathematical operations and to refer to the property of the channel.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmission system, comprising:
a light emitting device, which comprises:
a light emitting unit, wherein the light emitting unit comprises M light emitting elements; and
a control circuit for controlling the light emitting unit to sequentially display a plurality of pattern images in a plurality of frame times to form a spatiotemporal pattern image according to setting data corresponding to a temporal domain and a spatial domain; and
a light receiving device, which comprises:
an image capture unit for capturing the spatiotemporal pattern image;
a recognition unit for recognizing the spatiotemporal pattern image to output recognized data;
a repair unit for executing a parity check to repair the recognized data, wherein the repair unit repairs the recognized data according to the number of times of ignition and the parity check; and
a decoding unit for decoding the recognized data to output decoded data, wherein if the number of the light emitting elements, which break down, is greater than 2, the to-be-repaired spatiotemporal pattern image is divided into several spatiotemporal pattern image blocks having the same size, and the repair unit performs the parity check on each spatiotemporal pattern image block to repair the block.

2. The system according to claim 1, wherein the M light emitting elements comprise an $i^{th}$ light emitting element, wherein the setting data controls the $i^{th}$ light emitting element to be ignited in at least one of the frame times,
wherein M is a positive integer, and "i" ranges from 1 to M.

3. The system according to claim 2, wherein the recognition unit further comprising:
an alerting unit for outputting an alerting signal when the $i^{th}$ light emitting element is not ignited in the frame times.

4. The system according to claim 1, further comprising an input device for inputting the setting data.

5. The system according to claim 1, wherein the input device is a keyboard, a personal computer, a personal mobile digital assistant or any other device capable of inputting data.

6. The system according to claim 1, wherein the setting data comprises pattern data and flicker frequency data.

7. The system according to claim 1, wherein the control circuit comprises:
- a program memory for storing a program;
- a processor for executing the program to control the light emitting unit;
- an execution memory for temporarily storing data generated when the processor is executing the program;
- an output/input interface for receiving the setting data;
- a display interface for driving the light emitting unit;
- a clock circuit for providing a clock signal to the processor; and
- a power module for transforming an external power into a working power for the control circuit.

8. The system according to claim 7, wherein the control circuit further comprises:
- an internal power coupled to the power module.

9. The system according to claim 8, wherein the control circuit further comprises:
- an external power coupled to the internal power.

10. The system according to claim 9, wherein the external power is a solar energy or mains.

11. The system according to claim 7, wherein when the output/input interface is connected to an input device, the light emitting device enters a setting state to input the setting data.

12. The system according to claim 11, wherein the setting data is stored to the program memory.

13. The system according to claim 11, wherein when the output/input interface is disconnected from the input device from a connected state, the light emitting device enters a light emitting state to display the spatiotemporal pattern image.

14. The system according to claim 13, wherein the setting data is stored to the execution memory.

15. The system according to claim 14, wherein the setting data comprises pattern data and flicker frequency data, and the processor arranges the pattern data and the flicker frequency data and then outputs arranged data to the display interface.

16. A light receiving device, comprising:
- an image capture unit for capturing a spatiotemporal pattern image, wherein the spatiotemporal pattern image is formed according to a plurality of pattern images sequentially displayed in a plurality of frame times by a light emitting unit, and wherein the light emitting unit comprises M light emitting elements;
- a recognition unit for recognizing the spatiotemporal pattern image to output recognized data;
- a repair unit for executing a parity check to repair the recognized data, wherein the repair unit repairs the recognized data according to the number of times of ignition and the parity check; and
- a decoding unit for decoding the recognized data to output decoded data, wherein if more than two of the light emitting elements break down, the to-be-repaired spatiotemporal pattern image is divided into several spatiotemporal pattern image blocks having the same size, and the repair unit performs the parity check on each spatiotemporal pattern image block to repair the block.

17. A data transmission method, comprising:
- controlling a light emitting unit to sequentially display a plurality of pattern images in a plurality of frame times to form a spatiotemporal pattern image according to setting data corresponding to a temporal domain and a spatial domain, wherein the light emitting unit comprises M light emitting elements;
- capturing the spatiotemporal pattern image;
- recognizing the spatiotemporal pattern image to output recognized data;
- executing a parity check to repair the recognized data by a repair unit, wherein the repair unit repairs the recognized data according to the number of times of ignition and the parity check; and
- decoding the recognized data to output decoded data, wherein if the number of the light emitting elements, which break down, is greater than 2, the to-be-repaired spatiotemporal pattern image is divided into several spatiotemporal pattern image blocks having the same size, and the repair unit performs the parity check on each spatiotemporal pattern image block to repair the block.

18. The method according to claim 17, wherein:
- the M light emitting elements comprise an $i^{th}$ light emitting element;
- the setting data controls the $i^{th}$ light emitting element to be ignited in at least one of the frame times; and
- M is a positive integer, and "i" ranges from 1 to M.

19. The method according to claim 18, further comprising:
outputting an alerting signal when the $i^{th}$ light emitting element is not ignited in the frame times.

20. The method according to claim 17, further comprising:
inputting the setting data.

* * * * *